United States Patent [19]
Labaziewicz

[11] Patent Number: 6,011,657
[45] Date of Patent: Jan. 4, 2000

[54] OPTICAL APPARATUS FOR CHANGING FOCUS AND FOCAL LENGTH

[75] Inventor: Peter Labaziewicz, Rochester, N.Y.

[73] Assignee: Eastman Kodak Company, Rochester, N.Y.

[21] Appl. No.: 09/072,804

[22] Filed: May 5, 1998

[51] Int. Cl.⁷ .................................................. G02B 15/14
[52] U.S. Cl. .................. 359/691; 354/195.12; 354/195.1
[58] Field of Search ...................... 354/195.12; 359/823, 359/694, 699, 700

[56] References Cited

U.S. PATENT DOCUMENTS

| | | |
|---|---|---|
| 4,391,496 | 7/1983 | Schilling et al. . |
| 4,971,427 | 11/1990 | Takamura et al. . |
| 5,333,024 | 7/1994 | Labaziewicz ...................... 354/195.12 |
| 5,850,312 | 12/1998 | Kato et al. ............................... 359/689 |

Primary Examiner—Georgia Epps
Assistant Examiner—Tim Thompson
Attorney, Agent, or Firm—Milton S. Sales

[57] ABSTRACT

Apparatus having an optical system including two lens groups movable along an optical axis includes a zooming motor and a linkage interconnecting zooming motor and the two lens groups such that axial displacement of one of said lens groups effects axial displacement of the other of said lens groups. The linkage is configured so as to have a zooming zone, wherein axial displacement of one lens group effects substantially faster axial displacement of the other of said lens groups, such that the focal length of the optical system may be changed, and a focusing zone, wherein axial displacement of the one lens group effects substantially slower axial displacement of the other of said lens groups. Accordingly, the optical system can be focused by the zooming motor without requiring a large amount of lens travel.

9 Claims, 8 Drawing Sheets

OPTICAL APPARATUS FOR CHANGING FOCUS AND FOCAL LENGTH

FIELD OF THE INVENTION

The present invention relates to the field of photography and is directed to optical apparatus for varying the focal length and adjusting the focus of a multi-focal lens system.

BACKGROUND OF THE INVENTION

Modern cameras frequently include optical systems, sometimes called zoom lenses, having multiple or infinitely variable focal lengths ranging from wide-angle to telephoto. It is common in such optical systems to include lens groups that are moveable relative to each other along the optical axis to change the focal length of the system. When the focal length is changed, it is desirable at the same time to maintain focus throughout the entire range of focal lengths. This adjustment usually is accomplished by moving the optical elements relative to the film or other imaging plane.

In some lenses, an internal lens element or group is moved to change the lens focus. This is usually accomplished by the internal group changing the focal length of the lens unit slightly, thus moving the image plane and changing the back focus. This is called "internal focusing," and, since the focusing motion is internal to the lens, the lens unit itself does not move. Although compact, internal focusing requires separate focusing and zooming motors.

There are many techniques for controlling the movement of optical elements in a zoom lens system to maintain focus while also providing for multiple or infinitely variable focal lengths. One such technique is illustrated in U.S. Pat. No. 4,971,427, filed in the name of Takamara et al. and issued Nov. 20, 1990. The Takamara et al. patent discloses a camera having front and back lens groups and a bell crank coupled therebetween to vary the inter-group spacing and thereby change the focal length. Both lens groups are retained in a lens barrel that is movable along an optical axis relative to the film plane. Movement of the lens barrel causes the bell crank to engage and follow a cam plate that rotates the bell crank and shifts the back lens group along the optical axis relative to the front lens group.

Another technique is disclosed in U.S. Pat. No. 4,391,496, filed in the name of Schilling et al. and issued Jul. 5, 1983. According to the Shilling disclosure, an elbow linkage couples first and second lens groups in a pancratic objective system. The linkage includes a cam follower at the elbow for engaging and following a cam surface so that axial movement of the first lens group extends or contracts the linkage, changing the distance between the lens groups and the system focal length.

Optical systems that simultaneously change the focus and focal length, and particularly zoom lenses that include a cam and follower mechanism, such as those described above, are particularly sensitive to design and manufacturing tolerances. Axial movement of the lens groups, intended to focus the system, simultaneously is translated by the cam and follower mechanism into relative displacement of the lens groups, changing the focal length. In automated cameras that include switches and motors for driving the focusing mechanism, relatively precise alignment and tolerances are required, not only in the cam and follower mechanism, but throughout the position sensing and switching actuators.

In addition to precision requirements, prior art mechanisms frequently are complicated and typically provide for only one focus position at each discrete focal length, either increasing cost or reducing flexibility.

My commonly assigned U.S. Pat. No. 5,333,024, which issued on Jul. 26, 1994, discloses an optical apparatus that solves these problems by having first and second lens groups moveable along an optical axis, and including a cam and follower mechanism for changing the focal length of the optical system by communicating relative axial displacement to the second lens group in response to axial movement of the first lens group. The cam and follower mechanism is characterized by a plurality of cam steps, each having (1) a dwell cam surface extending parallel to the optical axis for accommodating axial movement of the first lens group to permit focusing of the optical system between focus positions at a fixed focal length for maintaining the relative axial displacement constant in response to axial movement of the first lens group, and (2) a ramped cam surface extending at an angle to the optical axis for displacing the second lens group relative to the first lens group in response to axial movement of the first lens group for changing the relative axial displacement in response to axial movement of the first lens group. The cam and follower mechanism includes a plurality of opposed pairs of cam steps, each pair including dwell cam surfaces extending parallel to each other and the optical axis, and ramped cam surfaces extending at an angle relative to each other and the optical axis.

While most zoom lenses used in compact cameras need two separate motors for zooming and focusing because the movement of the internal groups relative to the whole lens unit is different for zooming and focusing, the zoom lens mechanism of aforementioned U.S. Pat. No. 5,333,024 enables use of but a single motor for both zoom and focus. In certain parts of the cam, the lens groups move together as a unit (unit focusing). Although this is a simple way to focus, unit focusing requires a large amount of lens travel, especially at higher zoom focal lengths. This is a serious disadvantage, especially in small, compact cameras which have a large focus range. Accordingly, it would be a great improvement if a mechanism were available that reduced the focus travel significantly over unit focusing devices.

DISCLOSURE OF THE INVENTION

It is an object of the present invention to provide a zoom mechanism that provides for zooming and focusing with a single motor while minimizing focusing lens travel.

It is another object of the present invention to provide a zoom mechanism wherein a combination of unit and internal focusing is used, herein referred to as "combination" focusing.

According to one feature of the present invention, apparatus having an optical system including two lens groups movable along an optical axis includes a zooming motor and a linkage interconnecting zooming motor and the two lens groups such that axial displacement of one of said lens groups effects axial displacement of the other of said lens groups. The linkage is configured so as to have a zooming zone, wherein axial displacement of one lens group effects substantially faster axial displacement of the other of said lens groups, such that the focal length of the optical system may be changed, and a focusing zone, wherein axial displacement of the one lens group effects substantially slower axial displacement of the other of said lens groups. Accordingly, the optical system can be focused by the zooming motor without requiring a large amount of lens travel.

According to a preferred embodiment of the invention, the linkage includes a cam and follower mechanism for communicating relative axial displacement to the other of said lens groups in response to axial movement of the one lens group. The cam and follower mechanism includes a plurality of cam steps, one of said cam steps being associated with the zooming zone wherein axial displacement of the one lens group is communicated via the cam and follower mechanism to effect substantially faster axial displacement of the other of said lens groups, and another of said cam steps being associated with the focusing zone wherein axial displacement of the one lens group is communicated via the cam and follower mechanism to effect substantially slower axial displacement of the other of said lens groups. The cam step associated with the zooming zone has a cam surface at a non-zero first angle to the optical axis and said cam step associated with the focusing zone has a cam surface at a non-zero second angle to the optical axis, the absolute value of said first angle being substantially larger than the absolute value of said second angle. The first and second angles are of opposite slope relative to the optical axis.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The invention and its many advantages will become apparent from the following description taken in connection with the accompanying drawings, wherein.

DETAILED DESCRIPTION OF THE INVENTION

The invention is disclosed in connection with a conventional photographic still camera. Because such cameras are well known, this description is directed in particular to elements forming part of or cooperating directly with the disclosed embodiment.

Figure 1:
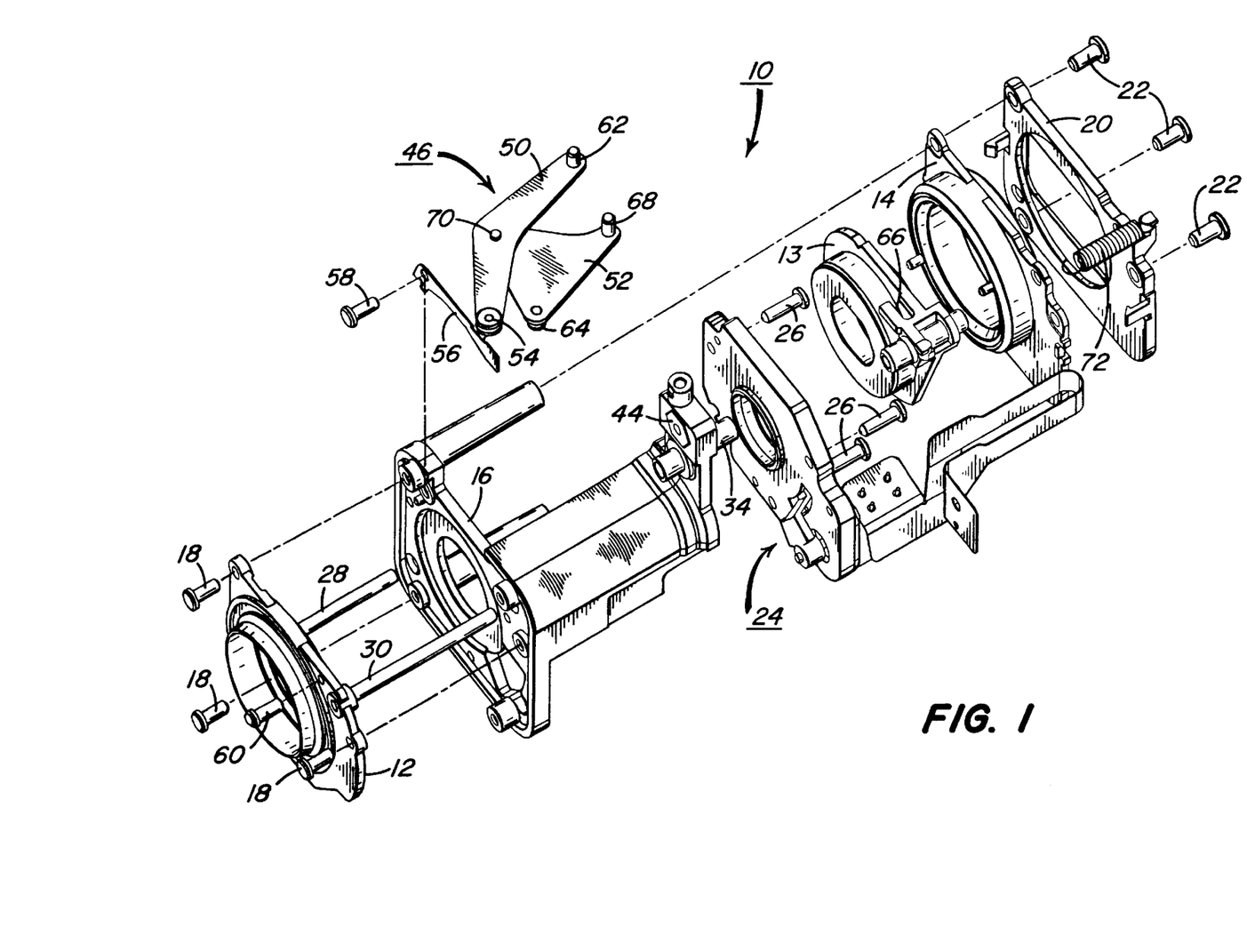
FIG. 1 is an exploded view of a zoom lens system according to the present invention.

Referring now to FIG. 1, an optical system in the form of a zoom lens 10 is depicted including front, middle, and rear lens groups 12, 13, and 14, respectively, disposed for movement along an optical axis. Front lens group 12 is fixed to a mechanism plate assembly 16 by fasteners 18. Rear lens group 14 and a rear lens baffle 20 are also fixed to mechanism plate assembly 16, held there by fasteners 22. A shutter assembly 24, of conventional design, is held to the mechanism plate by fasteners 26. Front lens group 12, mechanism plate assembly 16, rear lens group 14, rear lens baffle 20, and shutter assembly 24 are all assembled to move as a group along the optical axis.

Figure 2:
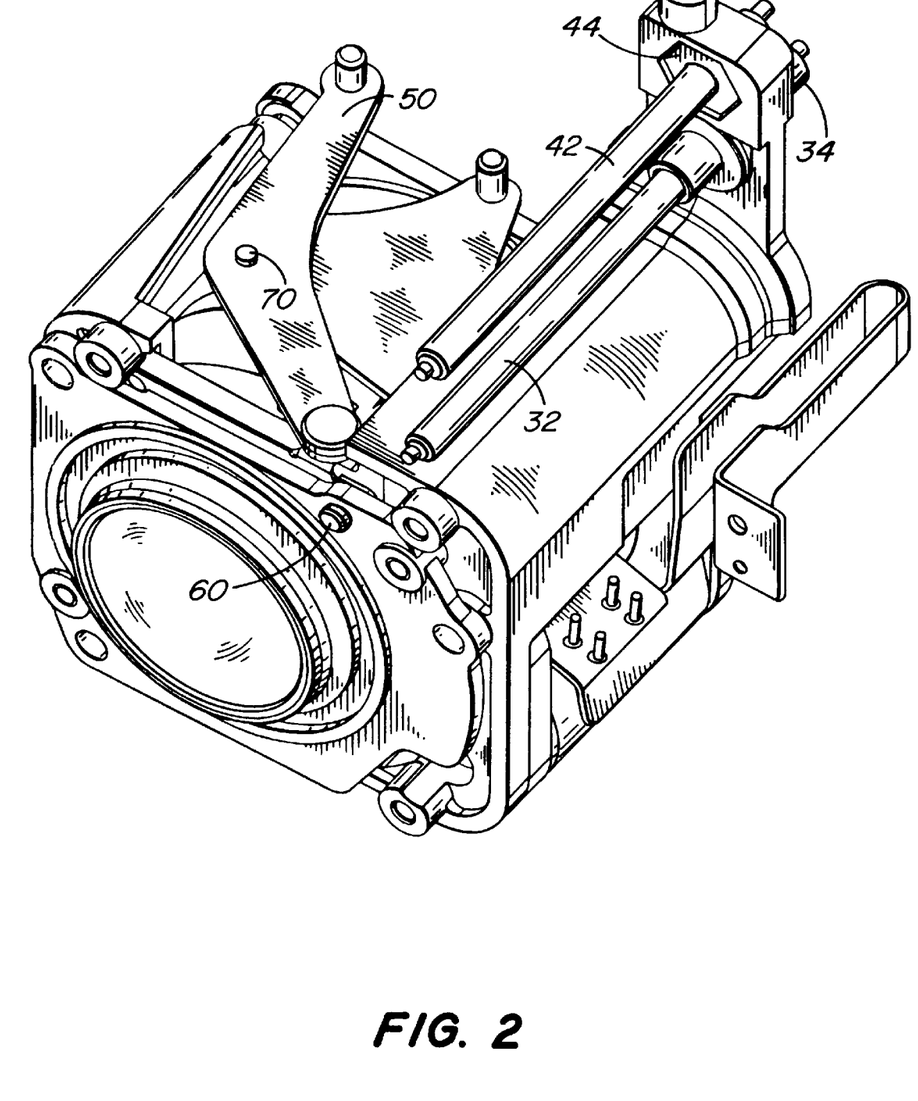
FIG. 2 is an exploded view of a portion of the zoom lens system of FIG. 1.

Middle lens group 14 is disposed for movement along the optical axis relative to front and rear lens groups 12 and 16. Front, middle, and rear lens groups 12, 13, and 14 are maintained in alignment perpendicular to the film plane, are prevented from rotating, and are mounted for lengthwise movement along the optical axis by a plurality of parallel guide rods 28, 30, and 32. Guide rod 32, shown in FIG. 2, is secured to the camera body, not shown, and extends through a bushing 34 on mechanism plate assembly 16 for aligning the lens groups relative to the camera body and film plane, not shown.

It will be clear to one skilled in the art that front, middle, and rear lens groups 12, 13, and 14 can include any number of appropriate combinations of lens elements interposed with shutter and other assemblies suitable for photographic exposures. It also will be apparent that other stationary and moveable groups of optical and related elements can be provided in cooperation with front, middle, and rear lens groups 12, 13, and 14 along the same optical axis.

Figure 3:
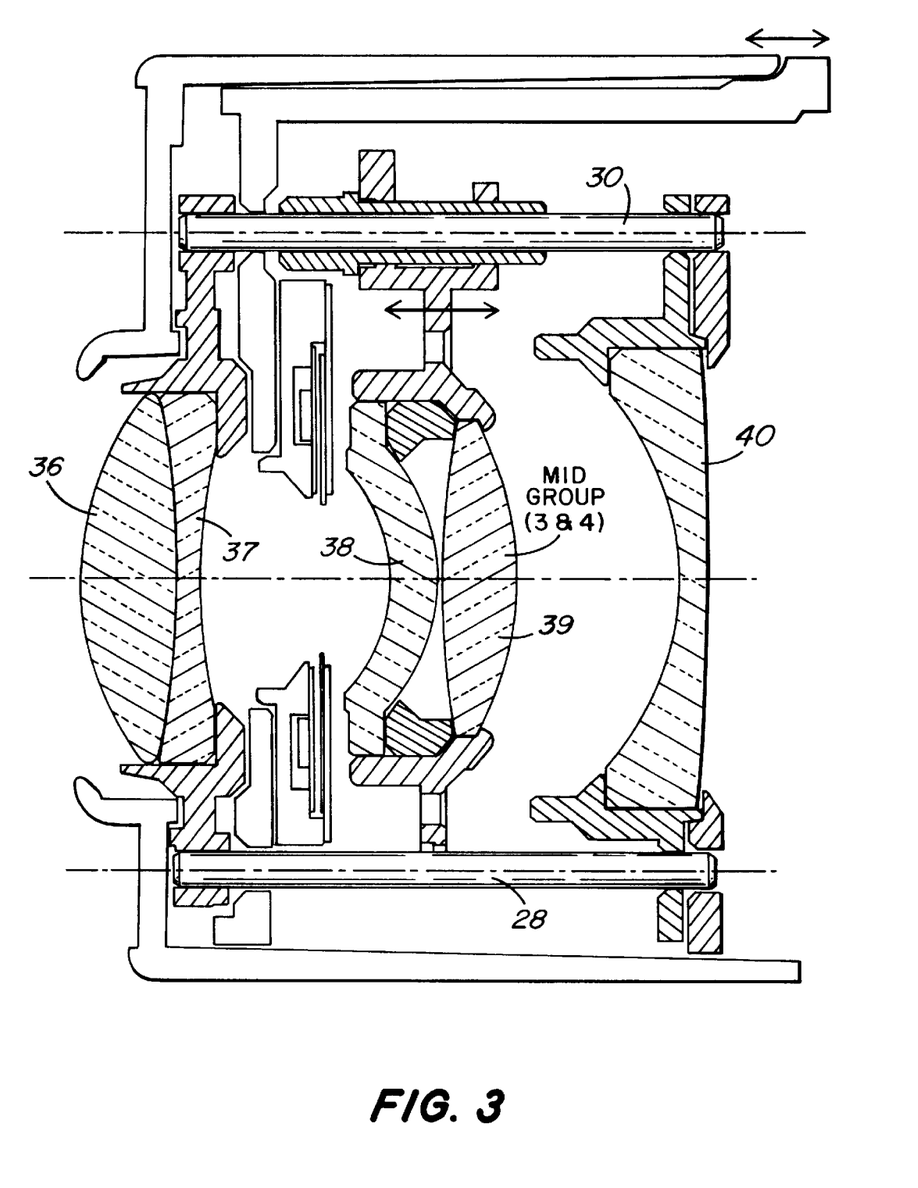
FIG. 3 is a side elevational view, partially in section, of lens groups of the zoom lens system of FIG. 1.

Referring to FIG. 3, the lens assembly of the illustrated embodiment of the present invention consists of five elements 36–40 in three groups. Front lens group 12 consists of elements 36 and 37, middle group 13 consists of elements 38 and 39, and rear lens group 14 consists of element 40. Since the front and rear lens groups are fixed one to the other, relative movement of the middle lens group changes distances "A" and "B".

Longitudinal movement of front lens group 12, mechanism plate assembly 16, rear lens group 14, rear lens baffle 20, and shutter assembly 24 along the optical axis is provided through a drive shaft 42 under control of a motor, not shown. Connection of the drive shaft and the motor is shown in the accompanying drawings, but it is conventional and can be viewed in the drawings of aforementioned U.S. Pat. No. 5,333,024. Drive shaft 42 is coupled to mechanism plate assembly 16 through a threaded nut 44 that translates rotary movement of the drive shaft into longitudinal movement of the mechanism plate assembly and the front and rear lens groups assembled therewith. Middle lens group 13, on the other hand, is moveable independently of the mechanism plate assembly along shafts 28 and 30.

Figure 4:
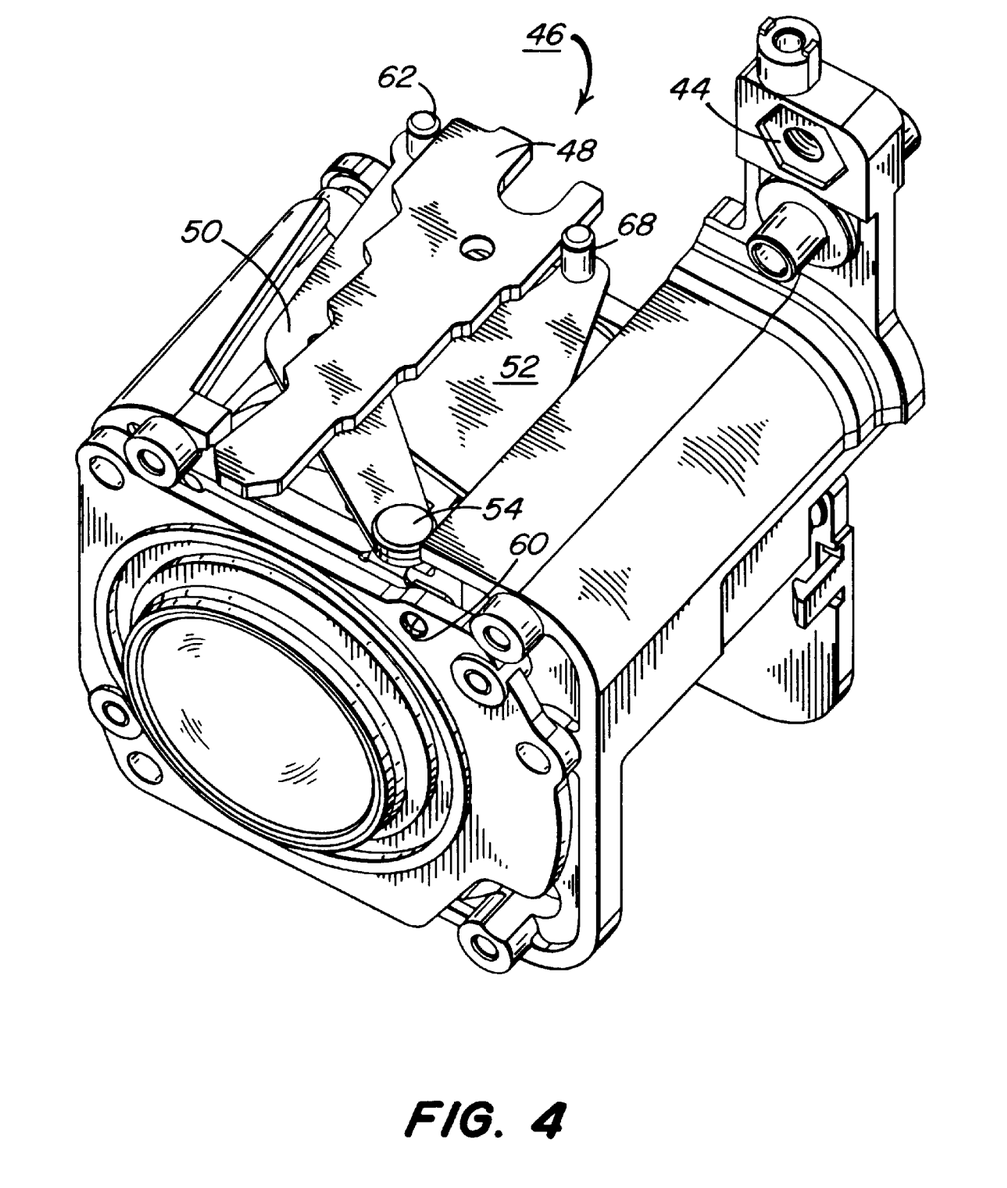
FIG. 4 is top perspective view, partially broken away, of the zoom lens system of FIG. 1.

The focus adjustment and focal length selection for the optical system are varied by a control device 46 which extends between and is coupled to mechanism plate assembly 16 and rear lens group 13. Referring to FIG. 4, the control device includes a cam 48 and cam follower mechanism for changing the focal length of the optical system by communicating relative axial displacement to the middle lens group in response to axial movement of the front and rear lens groups. The cam follower mechanism includes first and second L-shaped linkages 50 and 52. L-shaped linkage 50 has one end pivotally coupled to mechanism plate assembly 16 by a pin 54 via a spring lever 56 and second pin 58 such that spring lever 56 allows pin 54 to be moved axially by an adjusting screw 60 for focus calibration to change distance "A". The other end L-shaped linkage 50 carries a cam follower 62. L-shaped linkage 52 has one end coupled to middle group lens assembly 13 by a pin 64 and slot 66 (FIG. 1), permitting translational movement there between. Another end of L-shaped linkage 52 includes a cam follower 68. L-shaped linkages 50 and 52 form a scissors linkage coupled in their center sections by a floating pivot 70.

A spring 72 (FIG. 1) loads middle group lens assembly 13 rearwardly, which in turn urges cam followers 62 and 68 into engagement with the opposed cam surfaces of cam 48. The position of the middle group lens assembly is thus controlled by the space between the faces of the cam surfaces.

Figure 5:
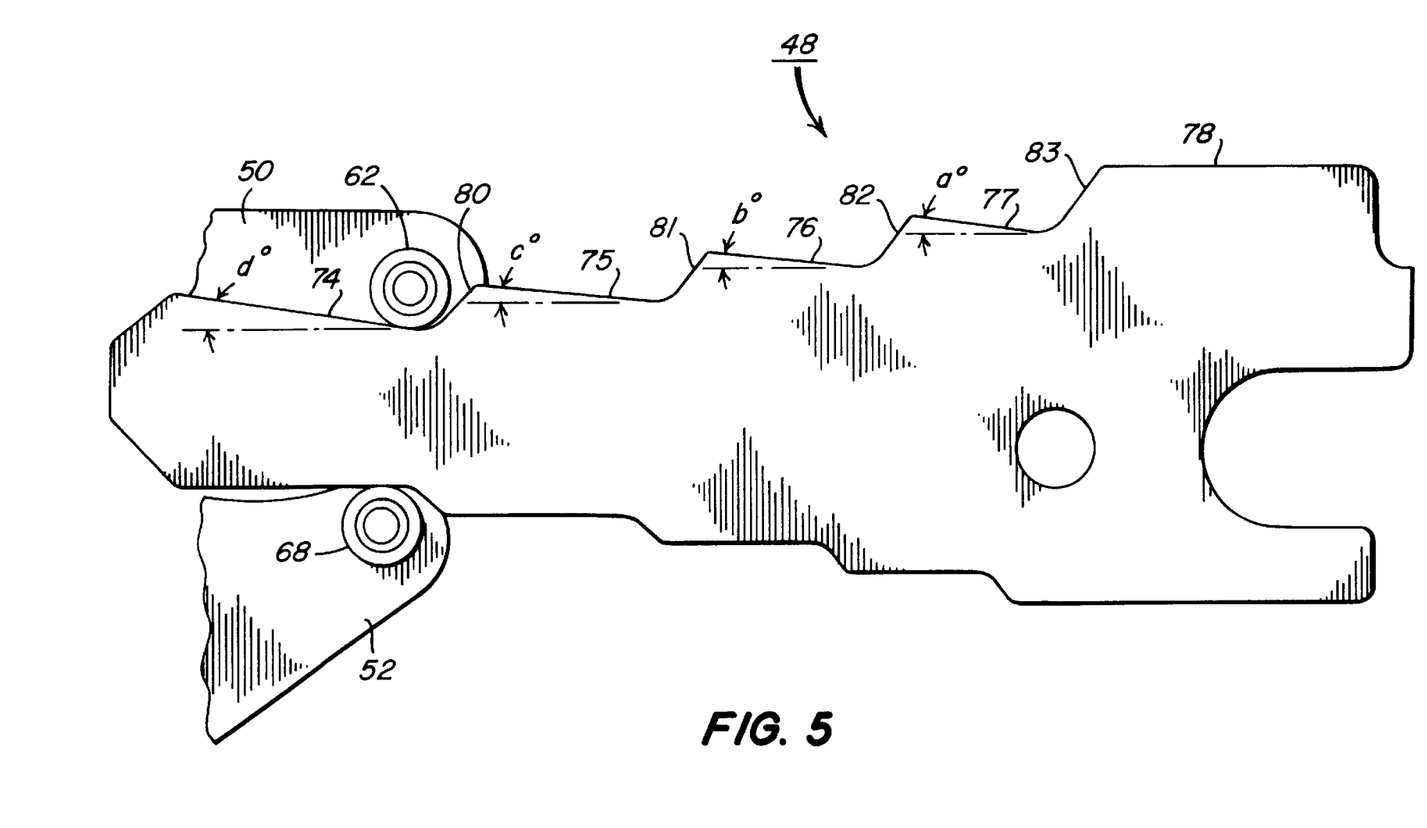
FIG. 5 is top plan view of a portion of the zoom lens system of FIG. 1.

Referring to FIGS. 4 and 5, cam 48 includes a plurality of cam steps, each step having a focusing zone 74–78, respectively, and a focal length change zone 80–83, respectively. The focal length is set first by selective operation of the motor to rotate drive shaft 42, operating through nut 44, to translate the rotary motion of the drive shaft into movement of the front group lens assembly along the optical axis. During this initial travel of the front group lens assembly, cam followers 62 and 68 are ramped apart by divergent cam surfaces that are angled away from each other and relative to the optical axis. This ramping movement spreads the cam followers and pivots the scissors linkage 50 and 52 apart, thereby displacing the middle group lens assembly relative to the front and rear group lens assemblies. All group lens assemblies move along the same axis, but by a different amount, thereby changing the focal length. After selection of a discrete a focal length, the focus can then be adjusted using the very same motor, drive shaft and mechanism to shift the first lens group so cam followers 50 and 52 transverse the cam sections 74–78. Such movement changes the optical system focus, permitting two or more focus settings for each discrete focal length. Focusing zones 74–77 have back angles a°, b°, c°, and d°, respectively. The back angles of the cam surface displaces the middle lens group relative to the front and rear lens groups in response to movement of the lens groups along the optical axis, and thereby changes the focal length of the optical system slightly during focusing.

Figure 6:
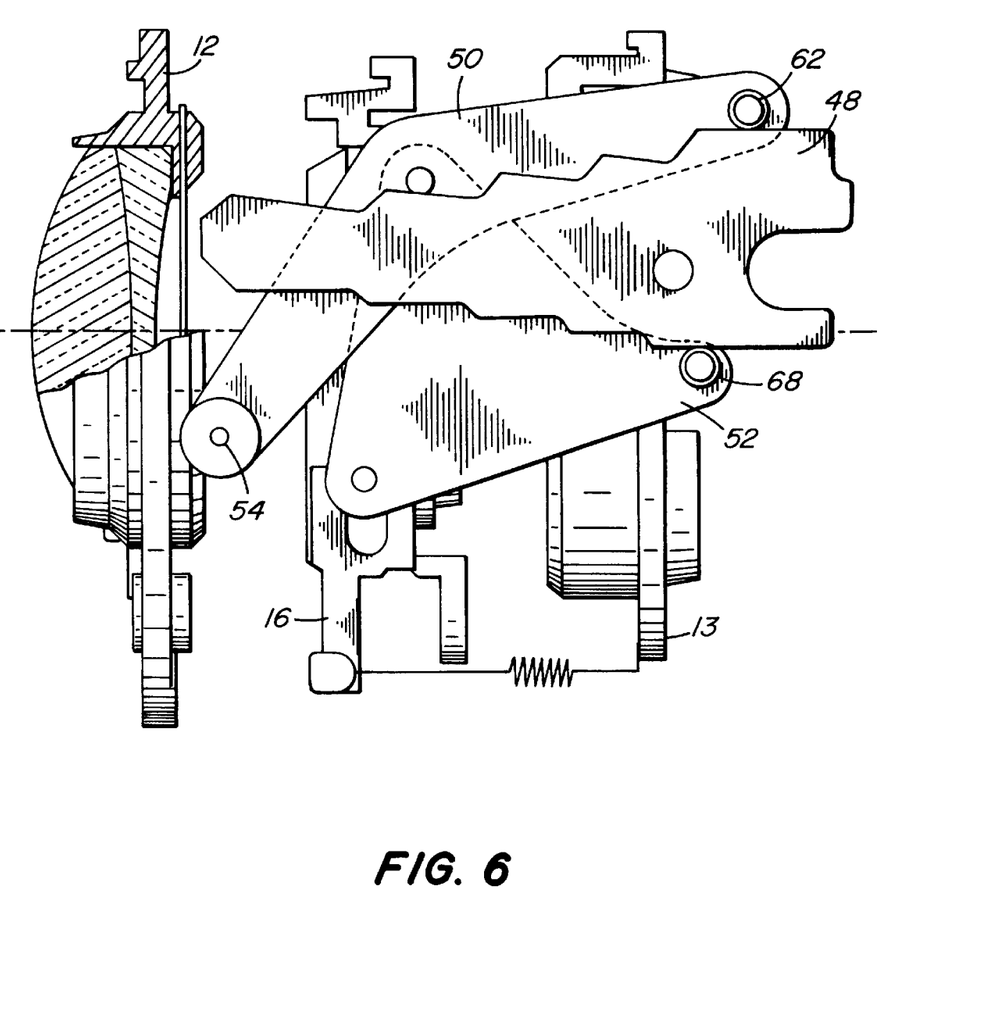
FIGS. 6–8 are top plan views, partially broken away, of the zoom lens system of FIG. 1 showing the system in different zoom conditions.

FIG. 6 illustrates the lens assembly in its wide angle configuration. Focusing zone 78 corresponds to the wide angle focal length, and accommodates axial movement of all of the lens groups without changing the relative displacement between the lens groups; thereby permitting unit focusing of the optical system between at least two focus positions at a fixed focal length. Unit focusing at the wide angle focal length is desirable because (1) at wide angle, say 30 mm, the focus travel for unit focus is relatively short, (2) relative movement of the middle group lens assembly would cause the focal length to decrease putting the lens out of it's design focal range and deteriorating lens performance, and (3) there may not be sufficient space between the middle group lens assembly and the rear group lens assembly to move the middle group lens assembly back any further.

Focal length change zones 80–83 correspond to five discrete focal lengths. On these steep ramps, distance "A" changes substantially relative to the travel of the lens unit; thereby changing the focal length of the lens assembly.

Figure 7:
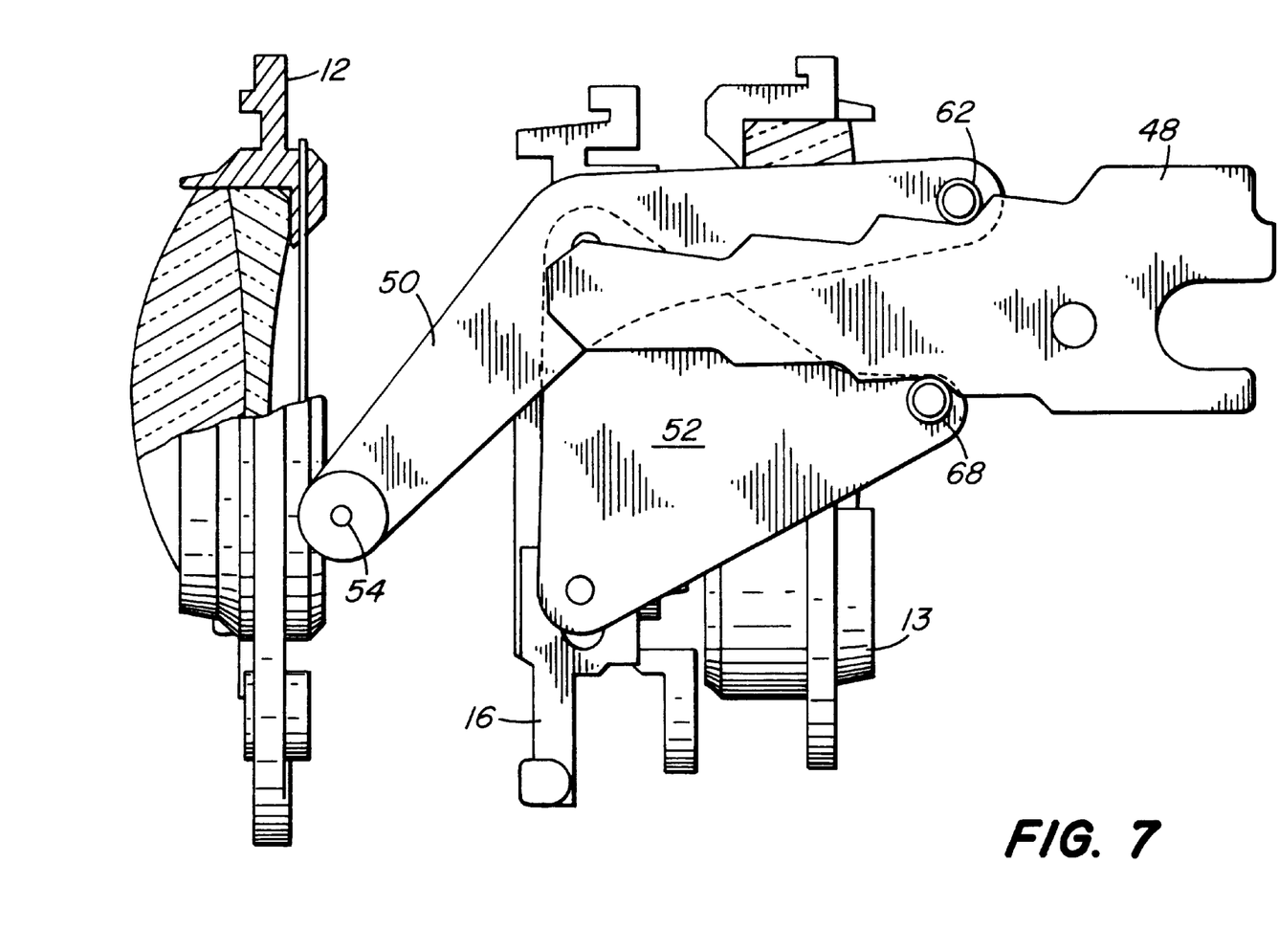
Figure 8:
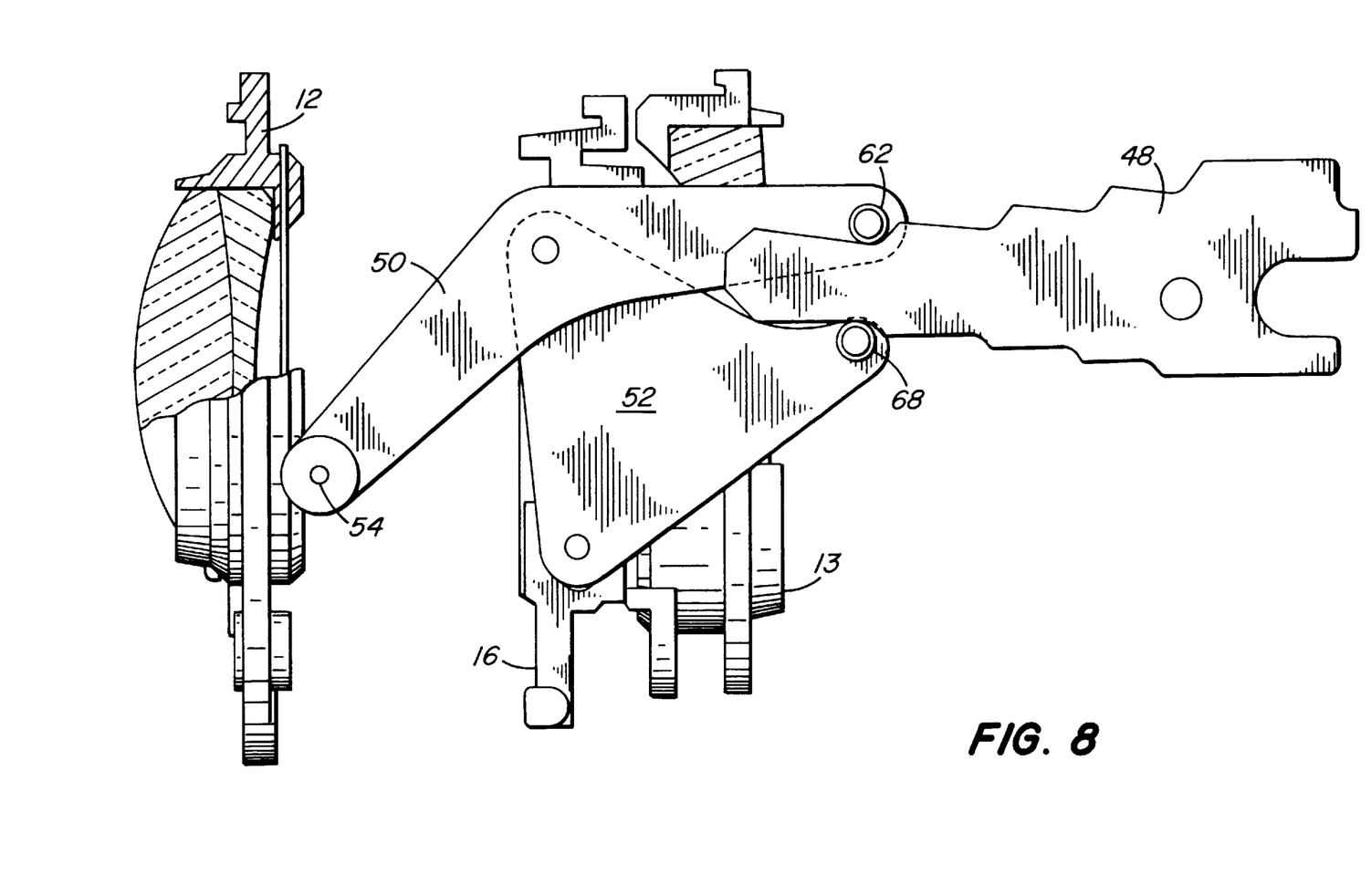

FIGS. 7 and 8 illustrate the lens assembly in its mid and telephoto configurations, respectively. Combination focus is effected in zones 74–77 to reduce the amount of focus travel. The distances between the sides of cam 48 determine the position of middle group lens assembly 13 relative to the front and rear group lens assemblies, and thus distance "A" between lenses 37 and 38. The cam is fixed to the camera frame, so as the lens unit moves forward, the cam followers are spread further apart due t the back angle on the cam, and distance "A" is decreased by an amount proportional to the lens travel.

Table 1 shows that the present invention provides an almost 50% reduction in focusing travel, with only an about 5% change in focal length, when compared to a similar unit focus apparatus.

TABLE 1

Comparison of focus travel for combination focus and unit focus.

| Type Focusing Mechanism | Focal Lth. (mm) | Focus Distance (ft) | Dist. "A" (mm) | Focus Travel (mm) |
|---|---|---|---|---|
| Combination Focus | | | | |
| far | 58.0 | infinity | 5.9 | 0 |
| near | 55.2 | 2.8 | 5.6 | 2.4 |
| Unit Focus | | | | |
| far | 58.0 | infinity | 5.9 | 0 |
| near | 58.0 | 2.8 | 5.9 | 4.6 |

Table 1 shows the comparison of the combination focus travel of the present invention and the lens extension for unit focus. This lens extension is given by Equation 1:

$$X = f^2/(d-2f), \quad (1)$$

where X is the lens extension, d is subject distance, and f is the focal length of the taking lens. This equation is often simplified to Equation 2:

$$X = f^2/d, \quad (2)$$

by assuming the focal length is small in comparison to the subject distance. Equation 2 is the equation of a straight line with lens extension "X" on the y-axis, 1/d on the x-axis, and a slope of $f^2$. This simple form of the equation is more easily implemented into software for the simple micro-controllers used to control the lens motion in cameras.

For combination focus, the length also changes as a function of the lens extension. If the cam ramp offset is linear, the equation is still of the same form as Equation 2, but the slope changes to a constant "m". The combination focus lens extension is given by Equation 3:

$$X = m/d, \quad (3)$$

where "m" is the slope of the combination focus equation.

The ratio of the lens extensions of combination focus to unit focus is then given by Equation 4:

$$R = m/f^2. \quad (2)$$

For a 58 mm telephoto lens position, m=6.62, $f^2$=11.03 ft, and

R=6.62/11.03=0.60.

Thus, for the 58 mm focal length, the combination focus travel is 60% of the unit focus travel.

The invention has been described in detail with particular reference to certain preferred embodiments thereof, but it will be understood that variations and modifications can be effected within the spirit and scope of the invention.

What is claimed is:

1. Apparatus having an optical system including two lens groups movable along an optical axis; said apparatus comprising:
   a zooming motor; and
   a linkage interconnecting zooming motor and the two lens groups such that axial displacement of one of said lens groups effects axial displacement of the other of said lens groups, said linkage being configured so as to have:
   (1) a zooming zone wherein axial displacement of one lens group effects substantially faster axial displacement of the other of said lens groups; such that the focal length of the optical system may be changed, and (2) a focusing zone wherein axial displacement of the one lens group effects substantially slower and non zero axial displacement of the other of said lens groups, whereby the optical system can be focused by the zooming motor without requiring a large amount of lens travel.

2. Apparatus as set forth in claim 1, wherein said linkage comprises a cam and follower mechanism for communicating relative axial displacement to the other of said lens groups in response to axial movement of the one lens group.

3. Apparatus having an optical system including two lens groups movable along an optical axis; said apparatus comprising:

a zooming motor; and a linkage interconnecting zooming motor and the two lens groups such that axial displacement of one of said lens groups effects axial displacement of the other of said lens groups, said linkage including a cam and follower mechanism for communicating relative axial displacement to the other of said lens groups in response to axial movement of the one lens group, wherein said cam and follower mechanism includes a plurality of cam steps and said linkage is configured so as to have:

(1) a zooming zone wherein axial displacement of one lens group effects substantially faster axial displacement of the other of said lens groups, such that the focal length of the optical system may be changed, and (2) a focusing zone wherein axial displacement of the one lens group effects substantially slower axial displacement of the other of said lens groups, whereby the optical system can be focused by the zooming motor without requiring a large amount of lens travel, one of said cam steps being associated with the zooming zone wherein axial displacement of the one lens group is communicated via the cam and follower mechanism to effect substantially faster axial displacement of the other of said lens groups, and another of said cam steps being associated with the focusing zone wherein axial displacement of the one lens group is communicated via the cam and follower mechanism to effect substantially slower axial displacement of the other of said lens groups.

4. Apparatus as set forth in claim 3, wherein said cam step associated with the zooming zone has a cam surface at a non-zero first angle to the optical axis and said cam step associated with the focusing zone has a cam surface at a non-zero second angle to the optical axis, the absolute value of said first angle being substantially larger than the absolute value of said second angle.

5. Apparatus as set forth in claim 4, wherein said first and second angles are of opposite slope relative to the optical axis.

6. Apparatus as set forth in claim 3, wherein said cam and follower mechanism includes scissors linkages having:

a first link extending between and coupled to the one lens group and the cam surfaces, a second link extending between and coupled to the other lens group and the cam surfaces, and a floating pivot connecting said first and second links in a center section thereof.

7. Apparatus for varying a focal length of a zoom lens system having first and second lens groups moveable along an optical axis, said apparatus comprising cam means for communicating motion to said first and second lens groups and cam follower means coupled with said first and second lens groups for engaging said cam means; characterized in that:

said cam means includes a plurality of cam surfaces arranged in a stepwise fashion connected by slant surfaces, each of said cam surfaces defining a discrete focal length for the zoom lens system, said focal lengths ranging from relatively long to relatively short focal lengths, said cam surfaces configured to adjust a relative to each other axial displacement of said first and second lens groups during axial movement of said first lens group; and said apparatus includes means for moving one of said lens groups to cause said cam follower means to engage a selected one of said plurality of cam surfaces to fix the focal length of the zoom lens system at one of said discrete focal lengths.

8. Apparatus as defined in claim 7, wherein said cam means extends at an angle to said optical axis and includes a plurality of pairs of cam surfaces, each of said pair of cam surfaces defining a discrete focal length for the zoom lens system.

9. Apparatus having an optical system including two lens groups movable along an optical axis such that (1) axial displacement of said lens groups relative one to the other would change the focal length of the optical system and (2) axial movement of the lens groups without displacement of said lens groups relative one to the other would change the focus of the optical system; said apparatus comprising:

a zooming motor; and a linkage interconnecting zooming motor and the two lens groups such that axial displacement of one of said lens groups effects axial displacement of the other of said lens groups, said linkage being configured so as to have:

(1) a zooming zone wherein axial displacement of one lens group effects substantial displacement of the other of said lens groups relative to the one lens group, such that the focal length of the optical system may be changed, and (2) a focusing zone wherein axial displacement of the one lens group effects only slight non zero displacement of the other of said lens groups relative to the one lens group, whereby the optical system can be focused by the zooming motor without requiring a large amount of lens travel.

* * * * *